United States Patent
Katayama et al.

(10) Patent No.: US 7,317,936 B2
(45) Date of Patent: Jan. 8, 2008

(54) VEHICLE INTERCOMMUNICATION APPARATUS

(75) Inventors: Mutsumi Katayama, Saitama (JP); Kazumitsu Kushida, Saitama (JP); Masashi Hino, Saitama (JP)

(73) Assignees: Honda Giken Kogyo Kabushiki Kaisha, Tokyo (JP); Honda Access Corp., Niiza-shi (JP)

( * ) Notice: Subject to any disclaimer, the term of this patent is extended or adjusted under 35 U.S.C. 154(b) by 397 days.

(21) Appl. No.: 10/410,612

(22) Filed: Apr. 10, 2003

(65) Prior Publication Data
US 2003/0220131 A1 Nov. 27, 2003

(30) Foreign Application Priority Data
Apr. 12, 2002 (JP) ............................ P2002-111276
Apr. 12, 2002 (JP) ............................ P2002-111277

(51) Int. Cl.
*H04M 1/00* (2006.01)
(52) U.S. Cl. ............................... 455/569.2; 455/556.1; 455/575.2
(58) Field of Classification Search ............... 455/41.2, 455/575.9, 556.1, 569.1, 569.2, 575.2, 575.6, 455/575.7; 2/5, 6.1, 6.6
See application file for complete search history.

(56) References Cited

U.S. PATENT DOCUMENTS

| 4,833,726 | A | * | 5/1989 | Shinoda et al. ............ 455/90.3 |
| 5,177,494 | A | * | 1/1993 | Dorrie et al. ................ 343/711 |
| 5,886,667 | A | * | 3/1999 | Bondyopadhayay . 343/700 MS |
| 6,061,029 | A | | 5/2000 | Hisada |
| 6,269,897 | B1 | * | 8/2001 | Tamura et al. .............. 180/168 |
| 6,345,186 | B1 | | 2/2002 | Schultz et al. |
| 6,483,467 | B2 | | 11/2002 | Kushida et al. |
| 6,560,443 | B1 | * | 5/2003 | Vaisanen et al. .............. 455/73 |
| 6,724,538 | B2 | | 4/2004 | Kushida et al. |
| 6,725,020 | B2 | * | 4/2004 | Yagi .......................... 455/90.1 |
| 6,876,845 | B1 | * | 4/2005 | Tabata et al. ............... 455/344 |
| 6,922,545 | B2 | | 7/2005 | Nakatsugawa |

(Continued)

FOREIGN PATENT DOCUMENTS

DE 196 18 532 A1 11/1997

(Continued)

OTHER PUBLICATIONS

Search Report dated Aug. 18, 2003.

(Continued)

*Primary Examiner*—Edward F. Urban
*Assistant Examiner*—Christian A. Hannon
(74) *Attorney, Agent, or Firm*—Westerman, Hattori, Daniels & Adrian, LLP.

(57) ABSTRACT

Two antennas are provided in a base station, one antenna AT1 is arranged at the root of a right handle grip [1R] and the other antenna AT2 is arranged at the root of a left handle grip [1L]. Alternatively, one antenna AT1 is arranged at the root of a front right turn signal [2R] and the other antenna AT2 is arranged at the root of a front left turn signal [2L] Alternatively, one antenna AT1 is arranged at the root of a rear right turn signal [3R] and the other antenna AT2 is arranged at the root of a rear left turn signal [3L]. Alternatively, one antenna AT1 is arranged at the front of a vehicle and the other antenna AT2 is arranged at the rear thereof.

9 Claims, 11 Drawing Sheets

U.S. PATENT DOCUMENTS

| | | | |
|---|---|---|---|
| 2002/0044535 A1 | 4/2002 | Tabata et al. | |
| 2002/0115409 A1* | 8/2002 | Khayrallah | 455/41 |
| 2002/0175868 A1* | 11/2002 | Reichert | 343/713 |
| 2003/0032460 A1* | 2/2003 | Cannon et al. | 455/569 |
| 2003/0092384 A1* | 5/2003 | Ross, III | 455/41 |
| 2003/0100324 A1* | 5/2003 | Kasapi | 455/504 |
| 2003/0130005 A1* | 7/2003 | Weisshaar et al. | 455/525 |

FOREIGN PATENT DOCUMENTS

| | | |
|---|---|---|
| EP | 0 967 738 A2 | 12/1999 |
| EP | 1 089 499 A2 | 4/2001 |
| FR | 2 593 338 A | 7/1987 |
| JP | 39-015502 Y | 6/1964 |
| JP | 51-053935 A | 5/1976 |
| JP | 58-176929 A | 10/1983 |
| JP | 61-220501 | 9/1986 |
| JP | 62-018840 A | 1/1987 |
| JP | 62-019083 B2 | 4/1987 |
| JP | 62-155535 | 10/1987 |
| JP | 63-035001 A | 2/1988 |
| JP | 63-142902 A | 6/1988 |
| JP | 64-68508 A | 3/1989 |
| JP | 05-091003 A | 4/1993 |
| JP | 05-102896 | 4/1993 |
| JP | 06-152489 A | 5/1994 |
| JP | 07-273704 | 10/1995 |
| JP | 11-266176 | 9/1999 |
| JP | 2980894 B1 | 9/1999 |
| JP | 11-341540 | 12/1999 |
| JP | 2000-284869 | 10/2000 |
| JP | 2001 148657 | 5/2001 |
| JP | 2001-148657 | 5/2001 |
| JP | 2001-168881 A | 6/2001 |
| JP | 2001-223713 | 8/2001 |
| JP | 2001-278153 A | 10/2001 |
| JP | 2001-285156 | 12/2001 |
| JP | 2001-339238 | 12/2001 |
| JP | 2001-352209 A | 12/2001 |
| JP | 2002-95057 A | 3/2002 |
| WO | WO 00/72463 A2 | 11/2000 |
| WO | WO 01 59945 A1 | 8/2001 |

OTHER PUBLICATIONS

Japanese Office Action dated Sep. 6, 2006, issued in corresponding Japanese Application No. 2002-111276.

Japanese Office Action dated Oct. 25, 2006, issued in corresponding Japanese Application No. 2002-111277.

Japanese Office Action dated Dec. 20, 2006, issued in corresponding Japanese Application No. 2002-111276.

Office Action from the Japanese Patent Office dated Feb. 28, 2007 in the corresponding Japanese Patent Application No. 2002-111277.

* cited by examiner

VEHICLE INTERCOMMUNICATION APPARATUS

BACKGROUND OF THE INVENTION

1. Field of the Invention

The present invention relates to a vehicle intercommunication apparatus for making short distance communication using ISM (Industry Science Medical) band.

2. Description of the Related Art

In the microfilm of Japanese Patent Application Laid-Open No. 62-155535, there is disclosed a vehicle intercommunication apparatus in which a base station is mounted on a vehicle and a headset configured with a speaker, a microphone, a portable radio terminal, and the like is provided on a helmet of an occupant in order to enable communication between occupants of a two-wheeler so that communication can be made via the base station between occupants on the same vehicle or occupants on different vehicles. A technique which employs Bluetooth as a wireless communication standard of the vehicle intercommunication is disclosed in Japanese Patent Application Laid-Open No. 2001-148657.

Since a radio wave propagation has rectilinearity, communication quality is largely influenced by a relative relationship between a size of shielding object present between radio terminals and a wavelength. In the communication of ISM (Industry Science Medical) band using a frequency of 2.5 GHz band in a region near to the upper limit of UHF band, not only a vehicle body but also an occupant's body strongly acts as a shielding object.

The Bluetooth which is a short distance wireless communication system utilizes the ISM band of 2.5 GHz, so that when this is employed for intercommunication or inter-vehicle communication, the communication quality thereof strongly depends on a relative position relationship between an occupant and a radio terminal. Therefore, when communication is made between a Bluetooth antenna provided on the vehicle and a Bluetooth antenna on the occupant, the communication quality is strongly influenced by a position of the antenna provided on the vehicle, a sitting position of the occupant who is a communication target, an accommodating position of the Bluetooth terminal on the occupant, and the like.

When a plurality of Bluetooth modules are provided in order to increase the number of radio terminals communicable with one base station, there is a possibility that interference between antennas of the respective Bluetooth modules occurs.

In the case where an antenna of the portable radio terminal is provided only at one portion of the rear of the helmet or the like, even when the occupant inclines his/her head to the side, the antenna is hidden behind his/her head viewed from the base station so that there is a possibility that the communication is shielded.

SUMMARY OF THE INVENTION

It is an object of the present invention to provide a vehicle intercommunication apparatus capable of securing high quality wireless communication even when an antenna of a portable radio terminal is provided at any place.

In order to achieve the above object, the present invention has its feature by the following means in a vehicle intercommunication apparatus comprising a base station mounted on a vehicle, an antenna thereof, a plurality of portable terminals owned by each occupant, and antennas thereof, wherein each portable terminal communicates via the base station.

(1) The base station comprises a plurality of antennas, where one antenna is arranged at the front of the vehicle and the other antenna is arranged at the rear thereof.

(2) The base station comprises a plurality of antennas, where one antenna is arranged at the right side of the vehicle and the other antenna is arranged at the left side thereof.

(3) The base station comprises a plurality of antennas, where one antenna and the other antenna are separately arranged sandwiching the occupant's sitting position.

(4) A pair of longitudinal antennas for portable terminal is arranged along the edge of the helmet and separately from each other.

(5) A pair of longitudinal antennas for portable terminal is arranged along the lower edges of the front and rear portions of the helmet.

(6) A pair of longitudinal antennas for portable terminal is arranged along the lower edges of the right and left sides of the helmet.

(7) A pair of longitudinal antennas for portable terminal is separately arranged at positions opposite to the outer shell of the helmet.

According to the above feature (1), since a plurality of antennas can be separately arranged at the maximum by making use of the vehicle length, it is possible to secure a wide communication area having less blind spots.

According to the above feature (2), since a plurality of antennas can be separately arranged at the maximum by making use of the vehicle width, it is possible to secure a wide communication area having less blind spots.

According to the above feature (3), since part of the vehicle or an occupant positioned between the antennas can function as a radio wave shielding object, interference between the respective antennas can be reduced. Further, even when reception at one antenna is prevented by the occupant as the radio wave shielding object, this can be compensated by the other antenna so that communication quality can be improved.

According to the above feature (4), it is possible to separately arrange a pair of antennas on the outer shell of the helmet without deteriorating its appearance.

According to the above feature (5), it is possible to secure a wide communication area having less blind spots even when the occupant faces any direction.

According to the above feature (6), it is possible to secure a wide communication area having less blind spots not only with a full-face helmet but also with a jet helmet.

According to the above feature (7), it is possible to arrange a pair of antennas at optimum positions where both can compensate for the communication area.

DETAILED DESCRIPTION OF THE PREFERRED EMBODIMENTS

Figure 1:
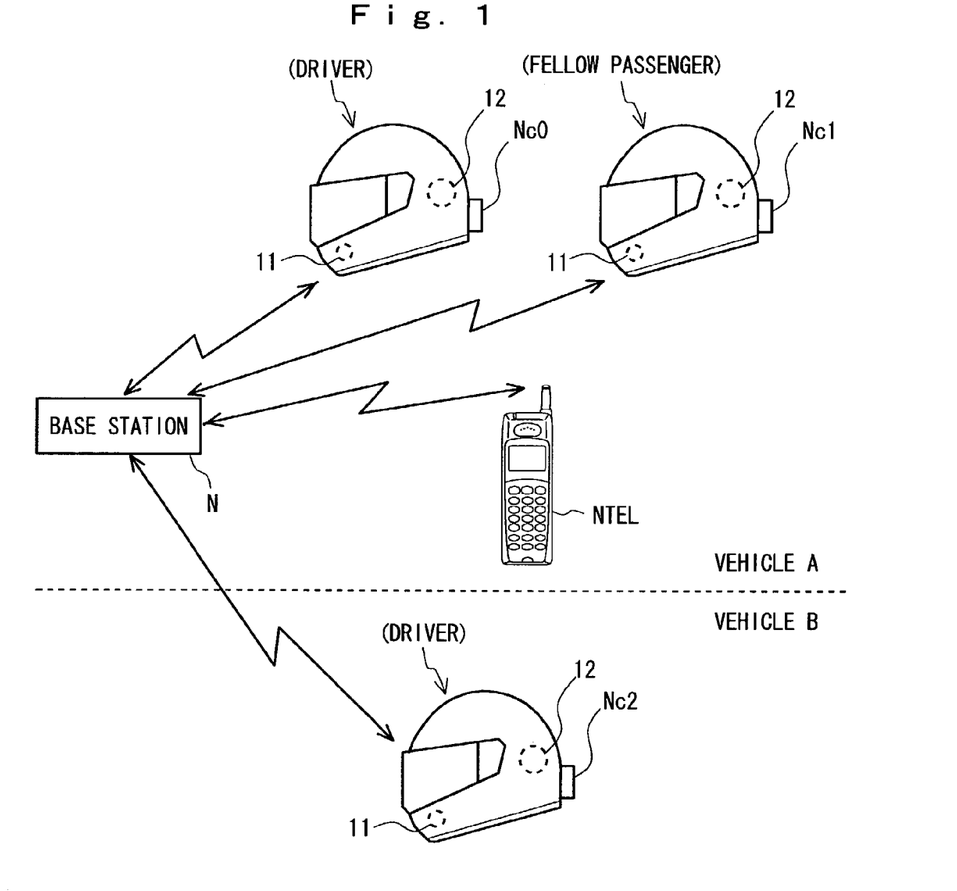
FIG. 1 is a diagram showing one example of a communication form by intercommunication according to the present invention.

Hereinafter, the preferred embodiments according to the present invention will be described with reference to the drawings. FIG. 1 is a diagram showing one example of a communication form by intercommunication to which the present invention is applied. A base station N is mounted on a vehicle A, and each helmet which occupants of each vehicle A, B puts on is provided with intercommunication including a microphone 11, a speaker 12, and a portable radio terminal Nx (NC0, NC1, NC2). Either a driver or a passenger of the vehicle A has a mobile phone NTEL. The base station N and the respective portable radio terminals Nx (including mobile phone NTEL) conform to the Bluetooth standard, and the base station N operates in a master mode and the other radio terminals Nx operate in a slave mode on a piconet which treats these terminals as accommodating terminals so that wireless communication is made therebetween.

Figure 2:
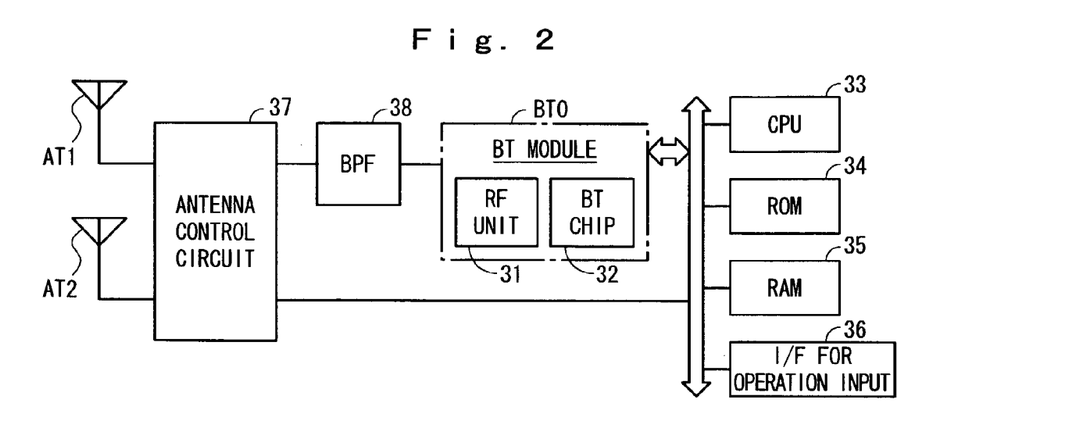
FIG. 2 is a block diagram showing a configuration (first embodiment) of a communication system of a base station N and portable radio terminals NC0, NC1, NC2 to which the present invention is applied.
Figure 3:
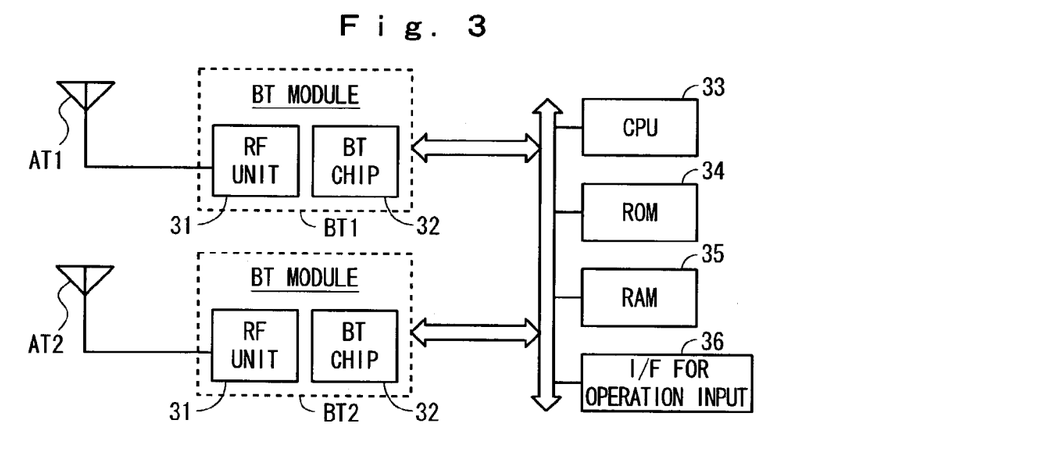
FIG. 3 is a block diagram showing a configuration (second embodiment) of a communication system of the base station N and the portable radio terminals NC0, NC1, NC2 to which the present invention is applied.
Figure 4:
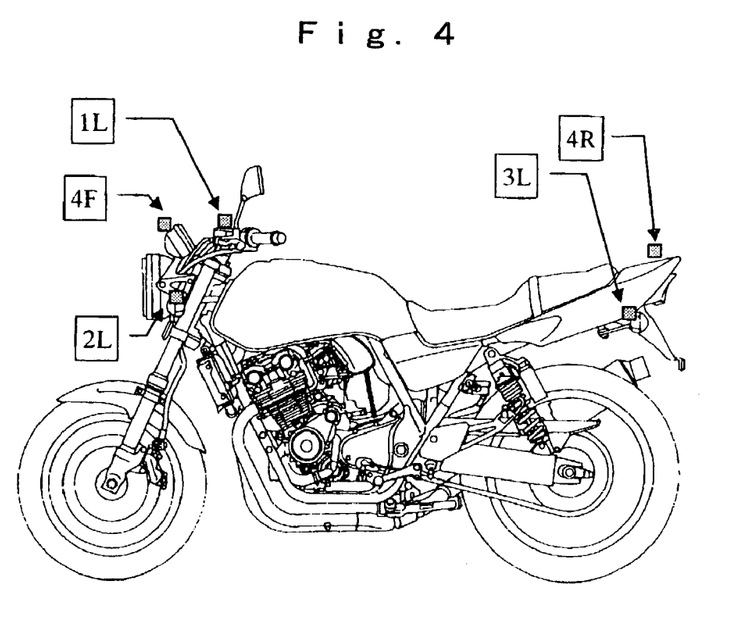
FIG. 4 is a side view showing an arrangement example of two antennas on a two-wheeler.
Figure 5:
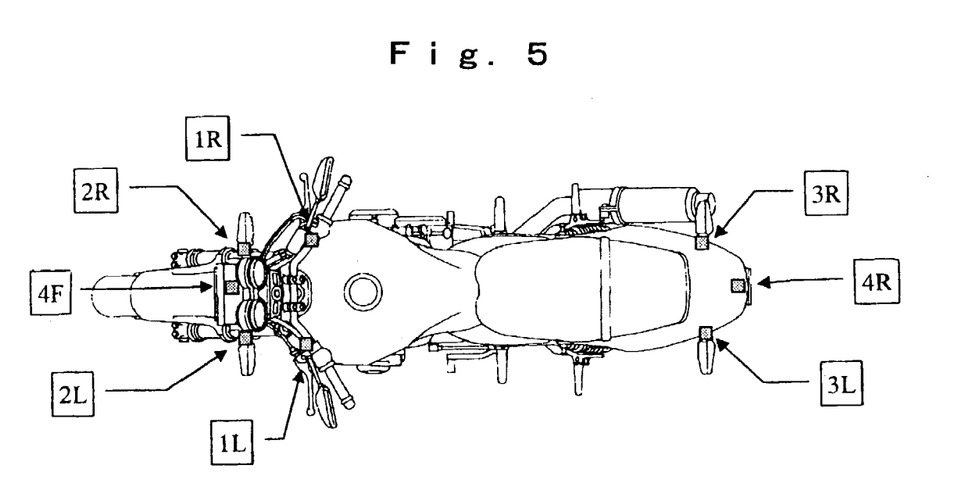
FIG. 5 is a top view showing an arrangement example of the two antennas on the two-wheeler.
Figure 6:
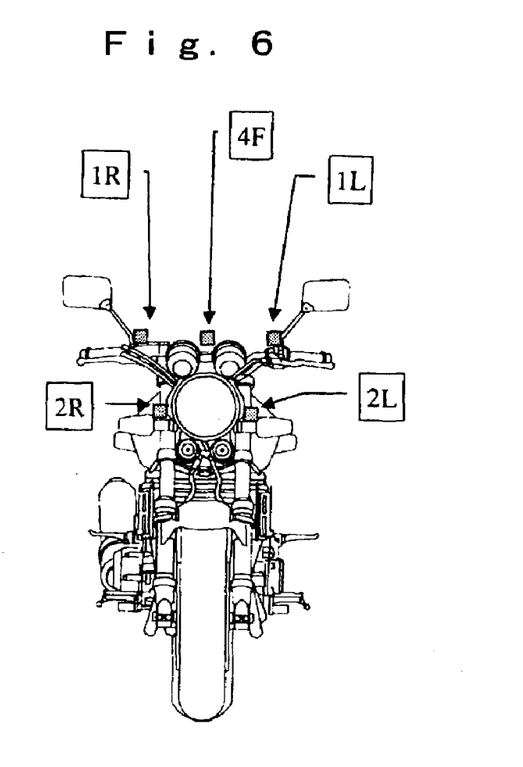
FIG. 6 is a front view showing an arrangement example of the two antennas on the two-wheeler.
Figure 7:
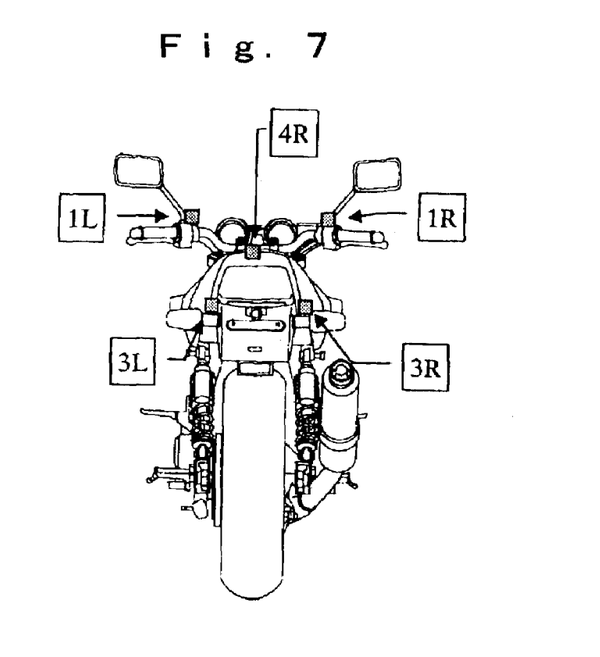
FIG. 7 is a back view showing an arrangement example of the two antennas on the two-wheeler.

FIGS. 2 and 3 are block diagrams showing configurations of a communication system of the base station N and the portable radio terminals NC0, NC1, NC2, respectively, and description of the configurations unnecessary for explaining the present invention is omitted. The present invention is such that at least two antennas AT1 and AT2 are arranged in each radio terminal.

According to a first embodiment shown in FIG. 2, the two antennas AT1 and AT2 are connected with the only one Bluetooth module BT0 via an antenna control circuit 37 and a bandpass filter (BPF) 38. The antenna control circuit 37 comprises a diversity reception function described later, which selects one signal received at either one of the antennas AT1 and AT2, or combines signals received at the two antennas to provide the same to BT0.

According to a second embodiment shown in FIG. 3, each radio terminal comprises two Bluetooth modules BT1 and BT2, and the antennas AT1 and AT2 are connected to BT1 and BT2, respectively.

A CPU 33 performs various processings according to a program stored in a ROM 34. A RAM 35 provides a work area for temporarily storing data and the like when the CPU 33 performs various processings. Various operation switches and display device are connected to an I/O interface 36 when the terminal is the base station N. When the terminal is any one of the portable radio terminals NC0, NC1, NC2, the display device or headset or the like is connected thereto.

BT0, BT1, and BT2 are mainly configured with an RF unit 31 and a Bluetooth chip 32, respectively. The chip 32 performs a processing of establishing a piconet with party terminals, a processing of encoding/decoding transmission/reception signals, and the like. In other words, each BT module digitally modulates a carrier signal by transmission data at the time of transmission, and spectrum-spreads the modulated carrier signal by a frequency hopping. This transmission signal is amplified to a transmission output level not more than a prescribed value, and then is transmitted from the antenna AT1 to the radio terminal at the communication party. Further, the radio signal incoming from the radio terminal at the communication party is received via the antenna AT1 to be subjected to inverse spectrum-spreading, and then is digitally modulated.

FIGS. 4, 5, 6, and 7 are diagrams showing arrangement examples of the antennas AT1 and AT2 when the base station N is mounted on a two-wheeler, respectively. According to the present embodiment, when one antenna AT1 is arranged at the right side of the vehicle, the other antenna AT2 is arranged at the left side thereof.

For example, one antenna AT1 is arranged at the root of a right handle grip [1R] and the other antenna AT2 is arranged at the root of a left handle grip [1L]. According to such an antenna arrangement, since a distance between the driver's helmet, his/her breast portion, and his/her right waist portion is a viewable distance from the antenna AT1 [1R] and a distance between the driver's helmet, his/her breast portion, and his/her left waist portion is a viewable distance from the antenna AT2 [1L], even when the antenna of the driver terminal NC0 is positioned at anyone of the helmet, his/her breast, and his/her waist portion, stable communication can be expected. Further, with respect to a passenger, when the antenna of the portable radio terminal NC1 is attached to the helmet, the distance therebetween is a viewable distance.

When communication with other vehicle B is considered, according to the antenna AT1 [1R], high sensitivity can be obtained when the vehicle B stops at the right side of the own vehicle during waiting at stoplight or when the vehicle B is turning to the right at the next intersection. According to the antenna AT2 [1L], high sensitivity can be obtained when the vehicle B stops at the left side of the own vehicle during waiting at stoplight or when the vehicle B is going into the next intersection from left side.

The present embodiment may be also configured such that one antenna AT1 is arranged at the root of a front right turn signal [2R] and the other antenna AT2 is arranged at the root of a front left turn signal [2L]. According to such an antenna arrangement, a distance from the antenna AT1 [2R] and the driver's helmet is longer than when the antenna AT1 is arranged at the position [1R], but a distance to his/her breast portion therefrom is equal and a distance to his/her right waist portion therefrom is made shorter. The antenna AT1 can be made indistinguishable as compared with the case where the antenna AT1 is arranged at the position [1R] so that the degree of freedom of appearance design is increased and productivity improvement is expected. Similar effects can be expected with respect to the antenna AT2 [2L].

The present embodiment may be configured such that one antenna AT1 is arranged at the root of a rear right turn signal [3R] and the other antenna AT2 is arranged at the root of a rear left turn signal [3L]. According to such an antenna arrangement, a distance from the antenna AT1 [3R] to the driver is made longer than when the antenna AT1 is arranged at the position [2R], but a distance to a passenger's right waist portion therefrom is made remarkably shorter. Further, communication with the other vehicle B approaching from right rearward direction is facilitated. Further, similarly to the case of being arranged at the position [2R], the degree of freedom of appearance design is increased so that productivity improvement is expected. Similar effects can be expected with respect to the antenna AT2 [3L].

The present embodiment may be also configured such that one antenna AT1 is arranged at the front of the vehicle and the other antenna AT2 is arranged at the rear thereof. For example, one antenna AT1 is arranged at the center of a meter unit [4F] and the other antenna AT2 is arranged at the rear of a rear seat [4R].

According to such an antenna arrangement, a distance between the antenna AT1 [4F], the driver's helmet, his/her beast portion, and his/her waist portion is made shorter. Specifically, even when the driver's antenna is positioned at either right or left side of his/her body, stable communication is similarly enabled. The stable communication is enabled with respect to the other vehicle B positioned in the traveling direction irrespective of whether the vehicle B is positioned at either right or left side of the own vehicle.

When the antenna is attached to the helmet, there is a possibility that a distance between the antenna AT2 [4R] and the driver is viewable. With respect to the passenger, communication with the antenna attached to the helmet rather than the position [3L] or [3R] is advantageous. When communication is made with the radio terminals or the like provided on the vehicle B, in the case of the vehicle present rearward in the traveling direction, stable communication is enabled irrespective of whether the vehicle is positioned at either right or left side of the own vehicle.

The present invention is not limited to these embodiments, and may be configured such that a pair of antennas AT1 and AT2 is arranged sandwiching an occupant's sitting position. For example, a combination of the root position of the left handle grip [1L] and the root position of the rear right turn signal [3R] or a combination of the root position of the right handle grip [1R] and the root position of the rear left turn signal [3L] may be employed other than the combination of the center of the meter unit [4F] and the rear of the rear seat [4R].

Since the present embodiment is configured such that when one of a pair of antennas AT1 and AT2 of the base station N is arranged at the right side of the vehicle, the other antenna is arranged at the left side thereof, a plurality of antennas can be separately arranged at the maximum by making use of the vehicle width and part of the vehicle or the occupant positioned between the antennas can function as a radio wave shielding object so that interference between the respective antennas can be reduced. Furthermore, even when reception at one antenna is prevented by the occupant as a radio wave shielding object, this can be compensated by the other antenna so that communication quality can be improved.

Further, since the present embodiment is configured such that when one of a pair of antennas AT1 and AT2 of the base station N is arranged at the front of the vehicle, the other antenna is arranged at the rear thereof, a plurality of antennas can be separately arranged at the maximum by making use of the vehicle length and part of the vehicle or the occupant positioned between the antennas can function as a radio wave shielding object so that interference between the respective antennas can be reduced. Further, even when reception at one antenna is prevented by the occupant as a radio wave shielding object, this can be compensated by the other antenna so that communication quality can be improved.

Figure 8:
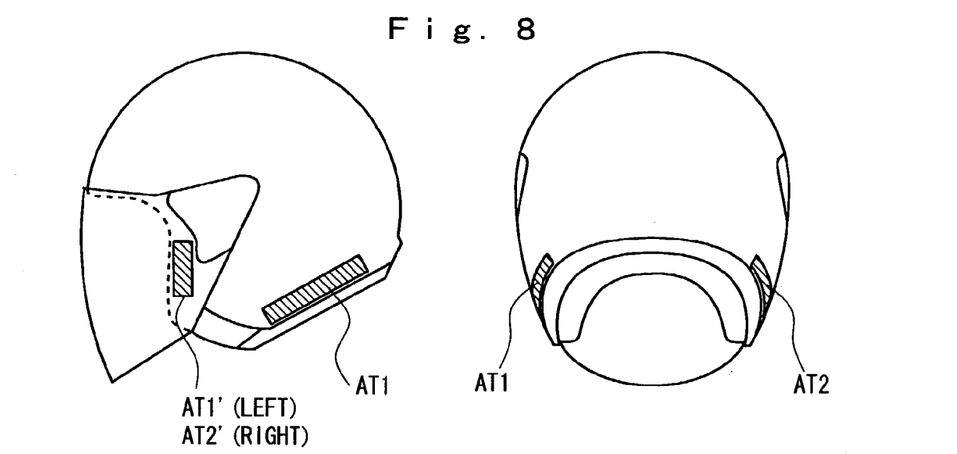
FIG. 8 is a diagram showing an arrangement example of the two antennas on a jet shape helmet.
Figure 9:
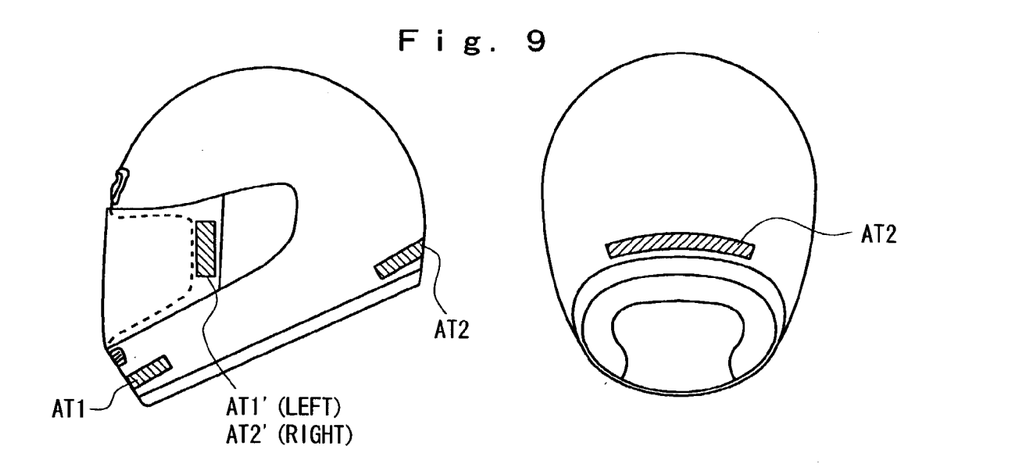
FIG. 9 is a diagram showing an arrangement example of the two antennas on a full-face helmet.

FIGS. 8 and 9 are diagrams showing a method for fixing the antennas AT1 and AT2 of the portable radio terminal Nx to the outer shell of the helmet, and the present embodiment employs longitudinal plane antennas.

In the example shown in FIG. 8, one antenna AT1 is arranged such that a longitudinal side is parallel to the lower edge of the left side face of the helmet or a trim (edge rubber) provided at the lower edge (left side of the drawing), and the other antenna AT2 is similarly arranged such that a longitudinal side is parallel to the lower edge of the right side face of the helmet (right side of the drawing). When it is assumed that the wavelength of the ISM band is 12 cm and the antenna is a half-wavelength dipole antenna, the full length of the antenna can be made shorter to about 6 cm so that the antennas can be provided along the edge of the helmet opening portion (AT1', AT2').

When the helmet is full-face, as shown in FIG. 9, one antenna AT1 may be arranged along the lower edge of the front portion of the helmet (left side of the drawing), and the other antenna AT2 may be arranged along the lower edge of the rear portion of the helmet (right side of the drawing). Further, when the antenna is a half-wave length dipole antenna even in the full-face helmet, the antennas can be provided along the edge of the helmet window (AT1', AT2').

In FIGS. 8 and 9, the antennas AT1 and AT2 are provided at the outer shell of the helmet, but the antenna may be laminated with a plastic film or the like to be attached on the trim of the lower edge of the helmet, alternatively the antenna may be made of conductive foil to be inserted into the trim in an integrated form.

In this manner, in the present embodiment, since a pair of antennas AT1 and AT2 is separately arranged at the outer shell face of the helmet, directionality is not affected between the antennas. Since each antenna AT1, AT2 is arranged along the lower edge of the helmet or the edge of the opening portion, a plurality of antennas can be arranged without deteriorating its appearance of the helmet or the degree of freedom of design.

Next, there is described a communication operation in the radio terminal having the configuration of the first embodiment shown in FIG. 2, that is, having only one BT module and the two antennas AT1 and AT2.

Figure 10:
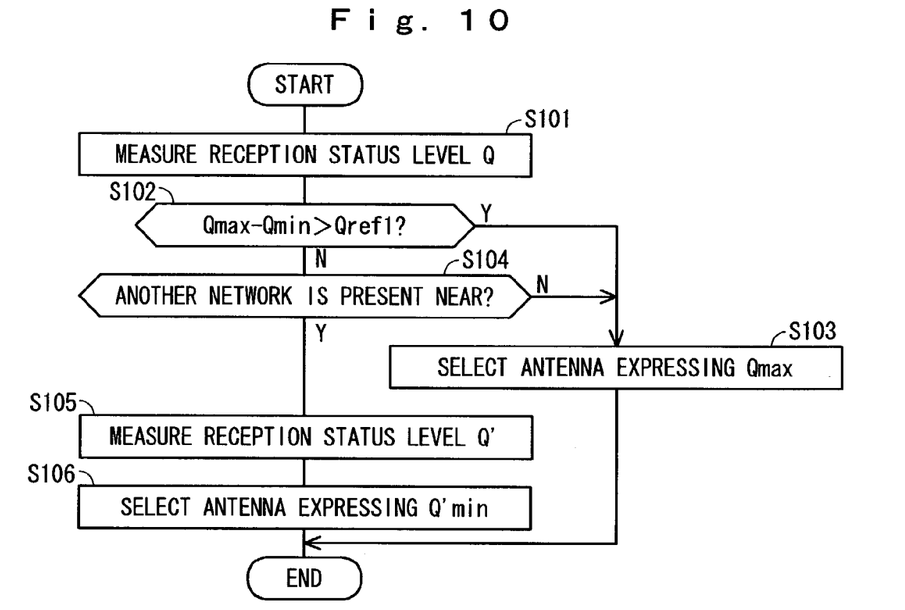
FIGS. 10 and 11 are flowcharts showing an antenna selecting method in the radio terminals according to the first embodiment.

FIG. 10 is a flow chart showing an operation of diversity reception which causes the antenna control circuit 37 to function as an antenna switch and selectively uses one of the signals received at a pair of antennas AT1 and AT2, which is mainly performed by the CPU 33.

In step S101, are a reception status level Q of a signal received at each antenna AT1, AT2 is quantitatively measured. The reception status level Q can be obtained on the basis of the function with only the reception strength or both the reception strength and the interference amount as a parameter.

In step S102, a difference between the maximum value Qmax and the minimum value Qmin of each reception status level Q is compared with a reference value Qref1. Here, description is made assuming that the reception status level Q[1] at the antenna AT1 is Qmax and the reception status level Q[2] at the antenna AT2 is Qmin. When the difference (Qmax−Qmin) is larger than the reference value Qref1, the antenna AT1 where the reception status level Q expresses the maximum value Qmax is selected as the current communication antenna by the antenna control circuit 37 in step S103.

When it is determined that the difference (Qmax−Qmin) is not larger than the reference value Qref1 in the step S102, a determination is made as to whether or not another network using the same frequency band as the frequency band being currently used is present in the vicinity in step S104. When it is determined that another network is not present, the processing proceeds to the step S103, where the antenna AT1 is selected. When it is determined that another network is present, the processing proceeds to step S105.

In step S105, a reception status level Q' at each antenna AT1, AT2 of the signal transmitted from the radio terminal belonging to another network is measured. In step S106, the antenna where the reception status level Q' expresses the minimum value Qmin is selected by the antenna control circuit 37.

According to the present embodiment, since a plurality of antennas are separately arranged and the antenna having the best reception status is selected therefrom, high quality wireless communication is always possible. Further, since an antenna position can be selected in correspondence to each communication party, interference due to the phase difference is not required to be considered unlike when the reception signals from a plurality of antennas are combined.

Figure 11:
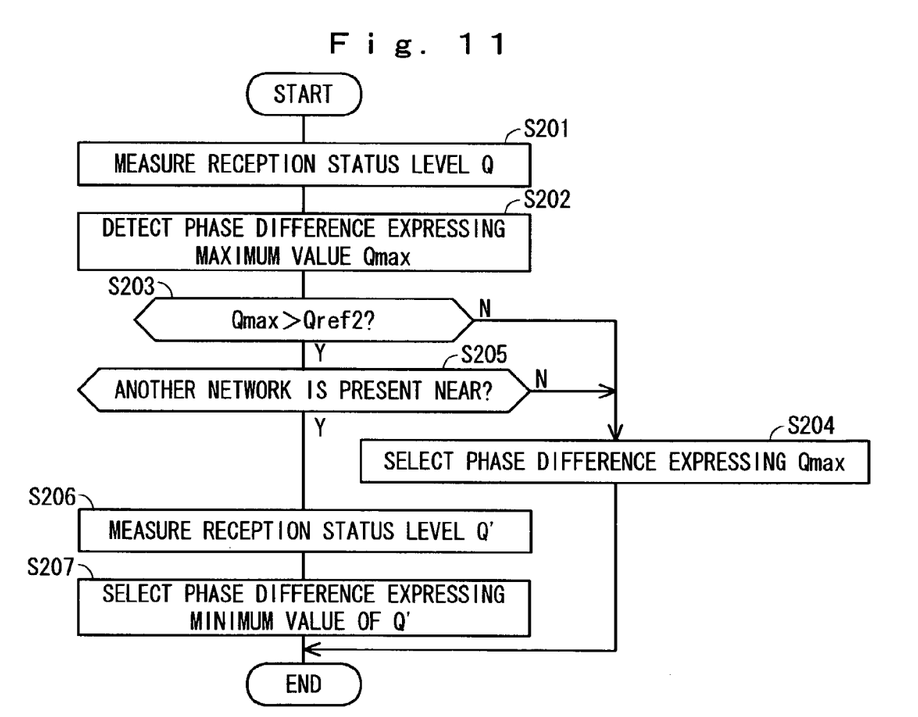

FIG. 11 is a flow chart showing an operation of diversity reception where the signals received at the two antennas AT1 and AT2 are combined in the base station N or the portable radio terminal Nx comprising one BT module and the two antennas AT1 and AT2 as described above.

In step S201, while the phase difference between the respective antennas AT1 and AT2 is being changed, the reception status level Q of the combined wave thereof is measured. In step S202, the phase difference where the reception status level Q expresses the maximum Qmax is detected. In step S203, the maximum value Qmax of the reception status level Q is compared with a predetermined reference value Qref2. When the maximum value Qmax of the reception status level Q is lower than the reference value Qref2, the phase difference at this time is selected as an optimum phase difference in step S204.

When the maximum value Qmax is more than the reference value Qref2, a determination is made as to whether or not another network using the same frequency band as the frequency band being currently used is present in the vicinity in step S205. When it is determined that another network is not present, the processing proceeds to the step S204, where the phase difference corresponding to the reception status level Qmax is selected as the optimum phase difference. When it is determined that another network is present, the processing proceeds to step S206, where the reception status level Q' of the signal transmitted from the terminal belonging to another network is measured for each phase difference. In step S207, the phase difference when the reception status level Q is not less than the reference value Qref2 and the reception status level Q' of the signal transmitted from the radio terminal belonging to another network is lowest is selected as the optimum phase difference.

According to the present embodiment, since the reception status level Q of the combined wave is measured while changing the phase difference between the signals received at the two antennas and the signals are received at the phase difference having the high reception status level Q, wireless communication with higher quality can be secured. According to the present embodiment, since interference with another network present in the vicinity is considered, the wireless communication with higher quality can be secured.

According to the present embodiment, since each antenna AT1, AT2 can be operated as a so-called phased array antenna, the phase difference having the strongest reception status level Q can be selected for each communication party, while the signal status level Q' from a transmission source other than the communication party can be restricted. Therefore, even when a piconet of another vehicle irrelevant to the own vehicle is present in the near range, a possibility that a packet collision between the piconets occurs can be restricted.

Next, there is described an operation of the base station having the configuration in FIG. 3, that is, having the two BT modules and the two antennas AT1 and AT2.

As shown in FIG. 3, even when a plurality of pairs of antennas and BT modules are provided, utilization efficiency is lowered when the respective terminals are concentrated on one BT module. Further, since the communication between the respective radio terminals is mainly made in the driver terminal NC0 and the driver as an operator switches the communication party while operating the base station N, the terminal NC0 is always held in the connected status and a link of the other portable radio terminals Nx is dynamically disconnected. In this manner, since a communication frequency of the driver terminal NC0 is higher than that of the other portable radio terminal Nx in intercommunication, it is desirable that a synchronization in the piconet of the terminal NC0 is preferentially established to the other terminals NC1, NC2, NTEL and communication with higher quality is provided to the terminal NC0. In the embodiment described later, a preferential connection of the driver terminal NC0 and an improvement in radio utilization efficiency are made compatible.

Figure 12:
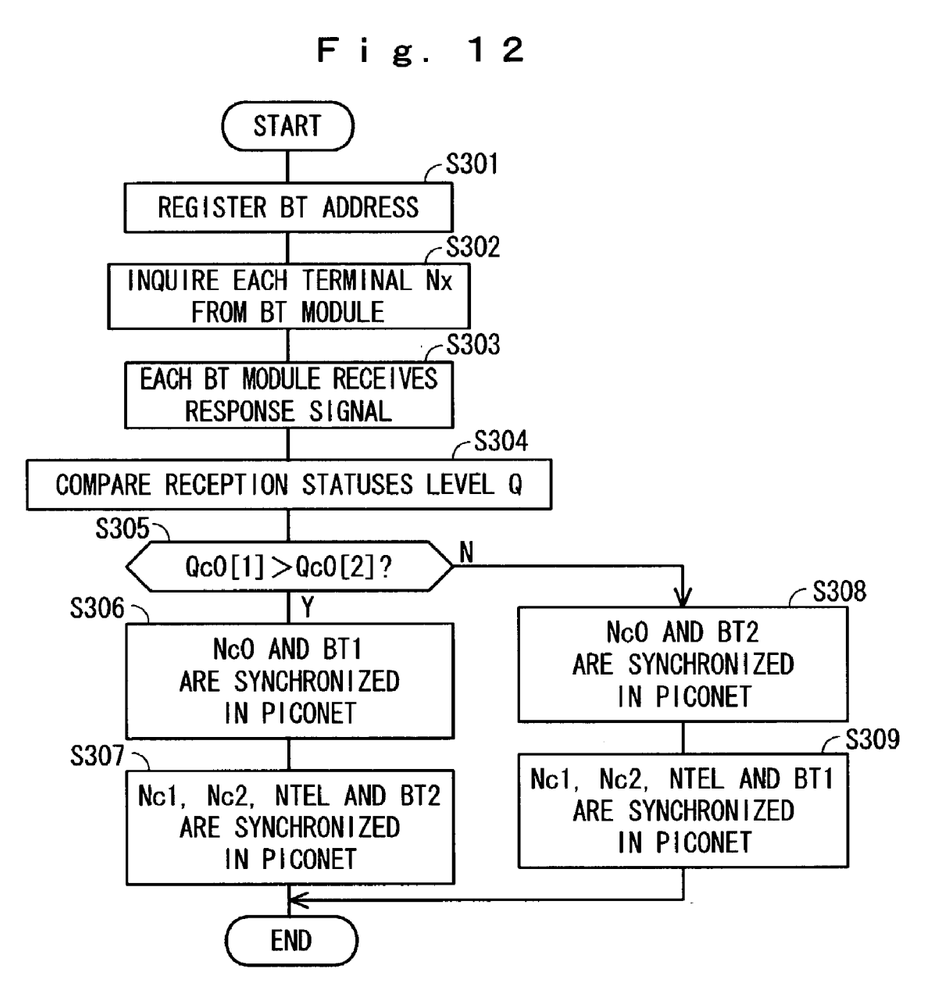
FIGS. 12 to 16 are flow charts showing a method for distributing a radio terminal to each antenna in the base station according to the second embodiment.

FIG. 12 is a flowchart showing an operation of distributing a plurality of radio terminals into the base station N having the configuration of the second embodiment shown in FIG. 3, that is, having the two antennas AT1 and AT2 and the two BT modules BT1 and BT2.

Figure 17:
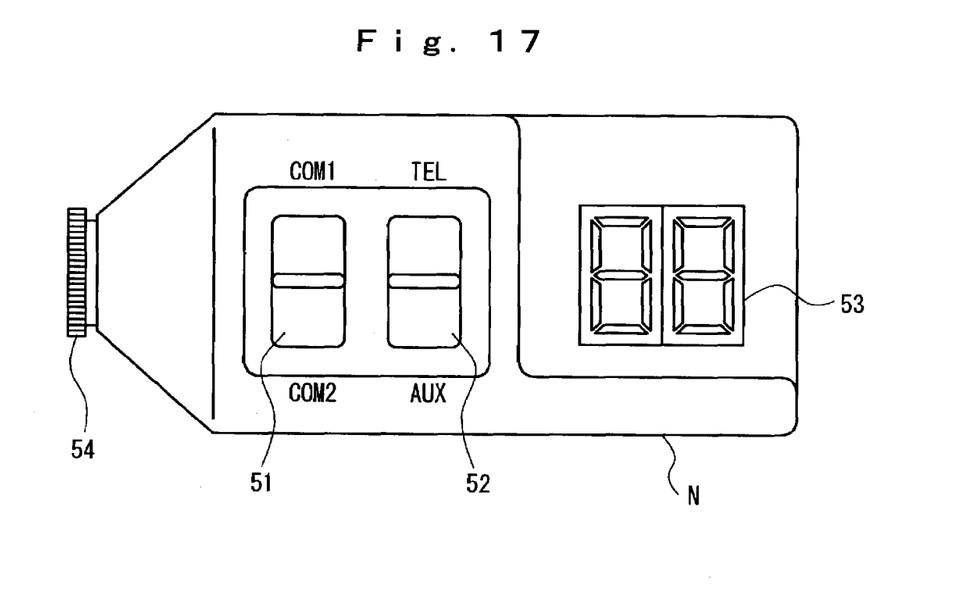
FIG. 17 is a plan view of the base station.

In step S301, a BT (Bluetooth) address previously assigned to each terminal Nx operating in a slave mode is registered in the base station N in correspondence to an identifier. FIG. 17 is a plan view of the base station N, which comprises toggle rebound switches 51, 52, an address display section 53, and a rotary encoder rotation knob 54.

Figure 18A:
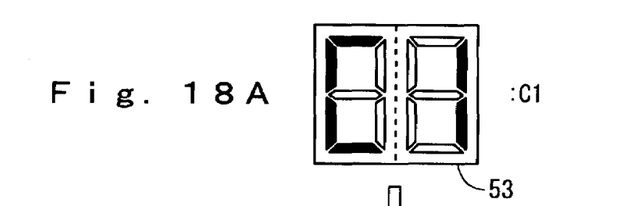
FIGS. 18A to 18C are diagrams showing an address registering method of portable radio terminals to the base station.

When an identifier "C1" is assigned to the BT address of the terminal NC1 of the passenger on the vehicle A, the rotation knob 54 is rotated in the status where the portable radio terminal NC1 is in the piconet connection device registration mode to display "C1" on the display section 53 as shown in FIG. 18A and to incline the rebound switch 51 to "COM1" side.

Figure 18B:
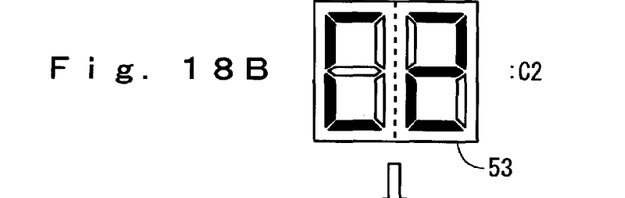
Figure 18C:
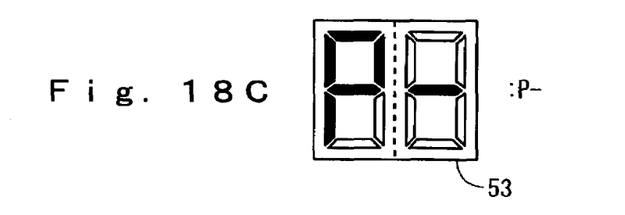

When an identifier "C2" is assigned to the BT address of the terminal NC2 in the vehicle B, "C2" is displayed on the display section 53 in the status where the portable radio terminal NC2 is in the piconet connection device registration mode (FIG. 18B), and then the rebound switch 51 is inclined to "COM2" side. Similarly, when an identifier "TEL" is assigned to the BT address of the mobile phone NTEL, "P-" is displayed on the display section 53 in the status where the mobile phone NTEL is accommodated in a coverage of the piconet (FIG. 18C), and then the rebound switch 52 is inclined to "TEL" side.

When the registration of the BT address to each portable radio terminal Nx is completed, an IQ packet is broadcasted to each terminal Nx from BT1 via the antenna AT1 so that an inquiry prescribed in the Bluetooth standard is performed in step S302 in FIG. 12. According to the present embodiment, internal communication is enabled between BT1 and BT2, and BT2 previously acquires a frequency skip pattern performed by BT1.

In step S303, BT1 receives a response signal (FHS packet) returned from each terminal Nx in response to this inquiry via the antenna AT1. According to the present embodiment, since BT2 recognizes the frequency skip pattern, BT2 also receives the response signal via the antenna AT2.

In step S304, reception status levels QC0[1] and QC0[2] at BT1 and BT2 of the response signals returned from the driver terminal NC0 are compared. When it is determined that the reception status level QC0 [1] is higher than the reception status level QC0[2] in step S305, BT1 performs paging to the terminal NC0 to establish the piconet so that BT1 and NC0 are synchronized in the piconet in step S306. In step S307, BT2 performs paging to the other terminals Nx (NC1, Nc2, NTEL) to establish the piconet.

When it is determined that the reception status level QC0[1]at BT1 is not higher than the reception status level QC0[2] at BT2 in the step S305, BT2 performs paging to the terminal NC0 to establish the piconet in step S308. Here, the frequency skip patterns of BT1 and BT2 can be different from each other. In step S309, BT1 performs paging to the other terminals Nx to establish the piconet.

Figure 19:
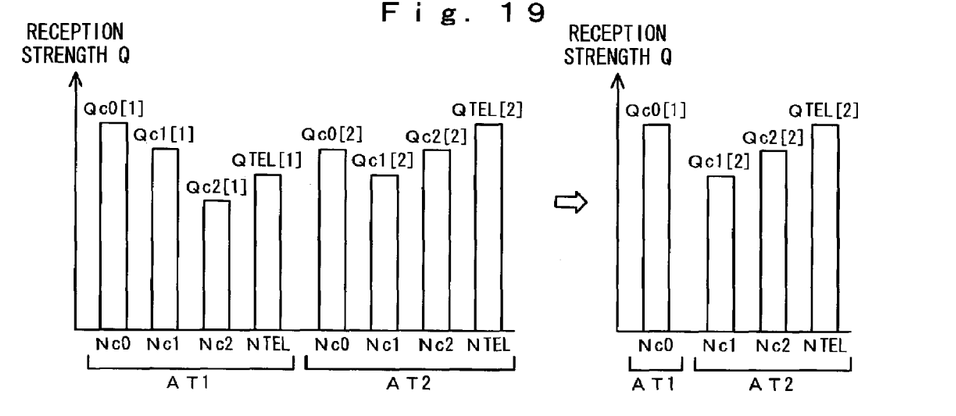
FIG. 19 is diagrams schematically showing operation of the flow chart shown in FIG. 12.

FIG. 19 is a diagram schematically showing a distributing method of each terminal according to the present embodiment. Since the reception status level QC0[1] of the driver terminal NC0 at BT1 is higher than the reception status level QC0[2] at BT2, BT1 establishes the piconet with the terminal NC0 and BT2 establishes the piconet with the other terminals NC1, NC2, NTEL.

According to the present embodiment, since the driver terminal NC0 establishes the piconet with one BT module having the stronger reception status level Q of the antenna and the other terminals establish the piconet with the other BT module, the preferential connection of the terminal NC0 and the improvement in radio utilization efficiency can be made compatible, and additionally high communication quality can be secured for the terminal NC0 with higher preference.

Figure 13:
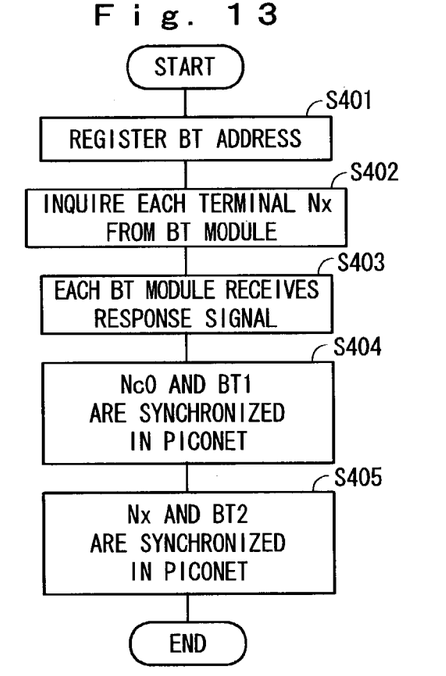

FIG. 13 is a flow chart showing another example of the operation of distributing a plurality of terminals into the base station N having the configuration of the second embodiment shown in FIG. 3, where in step S401 to step S403, the processing similar to that in steps S301 to S303 in FIG. 12 is performed.

According to the present embodiment, the BT module accommodating the driver terminal NC0 having higher preference is reserved on the basis of the arrangement status thereof or the like (BT1 in the present embodiment), BT1 performs paging to the terminal NC0 to establish the piconet in step S404. In step S405, BT2 performs paging to the other terminals Nx to establish the piconet.

According to the present embodiment, since the antenna which is arranged at a position optimum for the communication with the driver terminal NC0 is reserved as an antenna for the driver terminal and the driver terminal NC0 establishes the piconet with the reserved antenna, high communication quality can be secured for the driver's portable radio terminal NC0 with higher preference.

Figure 14:
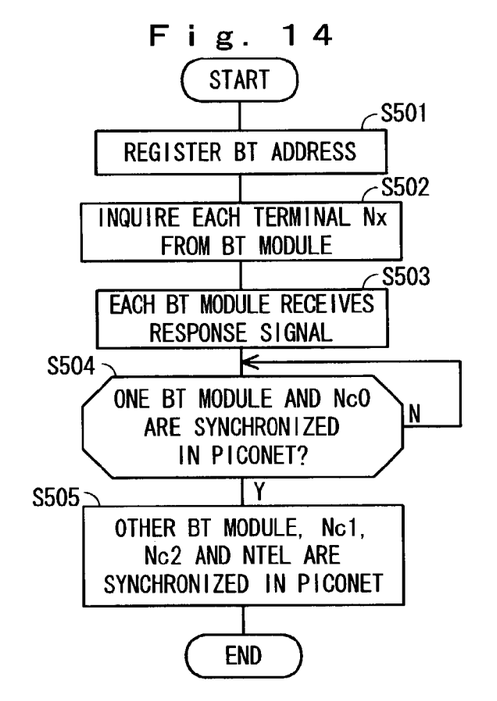

FIG. 14 is a flow chart showing still another example of the operation of distributing a plurality of terminals into the base station N having the configuration of the second embodiment shown in FIG. 3, where in steps S501 to S503, the processing similar to that in steps S301 to S303 is performed.

In step S504, a determination is made as to whether or not the piconet is established between one BT module and the terminal NC0. Here, when the piconet is established between one BT module and the terminal NC0, the piconet is established between the other BT module and the other portable radio terminals Nx in step S505.

According to the present embodiment, the piconet can be established for the driver terminal NC0 with higher preference.

Figure 15:
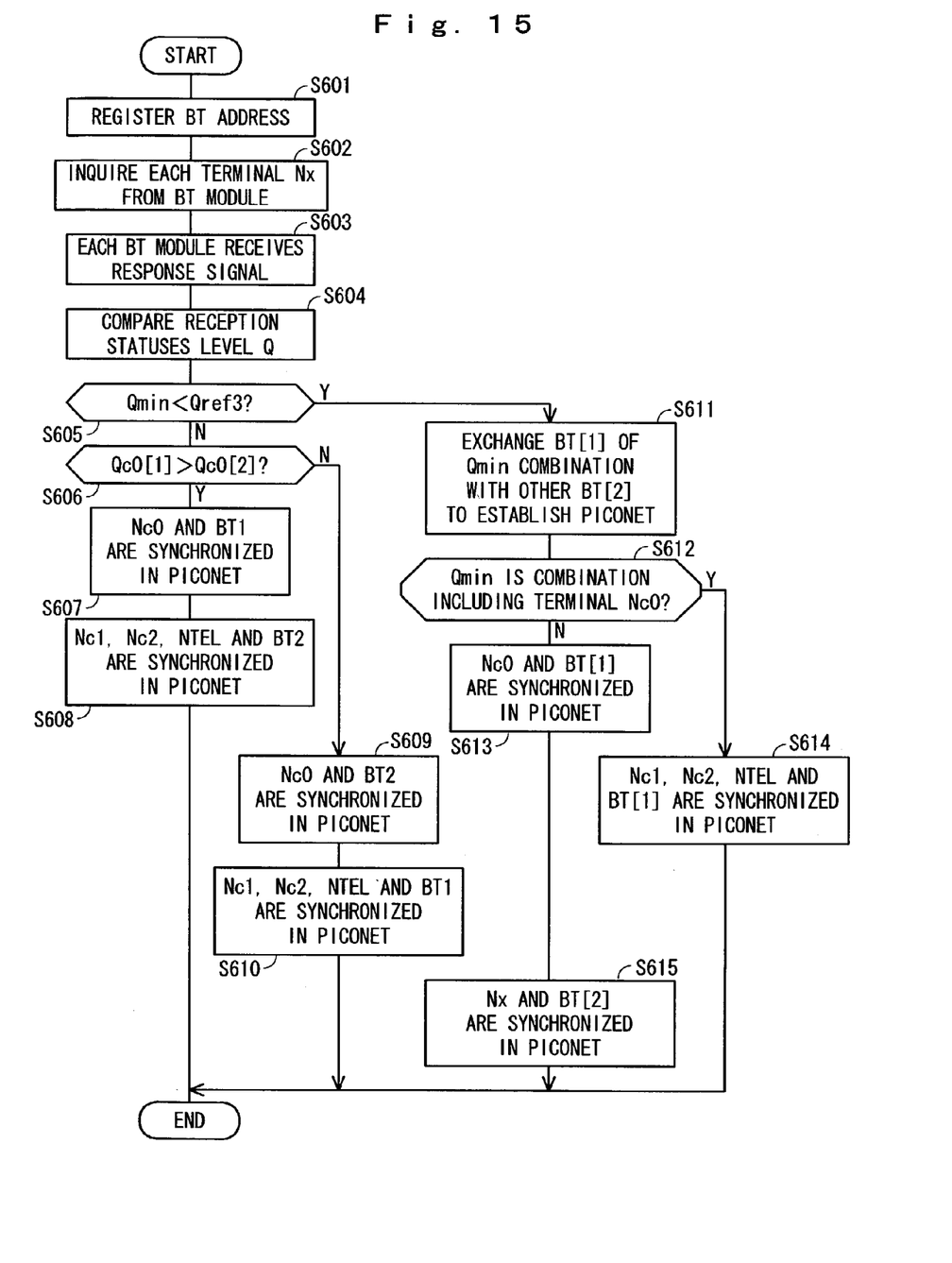

FIG. 15 is a flow chart showing still another example of the operation of distributing a plurality of terminals into the base station N having the configuration of the second embodiment shown in FIG. 3, where in steps S601 to S604, the processing similar to that in the steps S301 to S304 is performed.

In step S605, the minimum value Qmin out of the reception status levels Q of all the terminals is compared with a predetermined reference value Qref3. When the minimum value Qmin is not lower than the reference value Qref3, the processing proceeds to step S606. In step S606, the reception status level QC0[1] at the antenna AT1 of the terminal NC0 and the reception status level QC0[2] at the antenna AT2 are compared. In the case of QC0[1]>QC0[2], the processing proceeds to step S607, where BT1 performs paging to the terminal NC0 to establish the piconet. In step S608, BT2 performs paging to the other terminals Nx (NC1, NC2, NTEL) to establish the piconet.

When it is determined that QC0[1]>QC0[2] is not established in the step S606, BT2 performs paging to the terminal NC0 to establish the piconet in step S609. In step S610, BT1 performs paging to the other terminals Nx to establish the piconet.

When it is determined that the minimum value Qmin is lower than the reference value Qref3 in the step S605, in the case where the combination expressing the minimum value Qmin is a combination of the BT module [1] and the terminal Nx, the piconet is established between the other BT module [2] and the terminals Nx in step S611 (for example, in the case where the combination expressing the minimum value Qmin is a combination of BT1 and the terminals Nx, the piconet is established between BT2 and the terminals Nx).

In step S612, a determination is made as to where or not the terminal expressing the minimum value Qmin is the driver terminal NC0. In the case of the terminal NC0, the piconet is established between the other BT module [1] and the remaining terminals Nx in step S614.

When the terminal expressing the minimum value Qmin is a terminal other than the driver terminal NC0, the piconet is established between the terminal NC0 and the BT module [1] in step S613. In step S615, the piconet is established between the terminal Nx other than the terminals Nx with which the piconet is established with the terminal NC0 and the BT modules [2], and the BT module [2].

Figure 20:
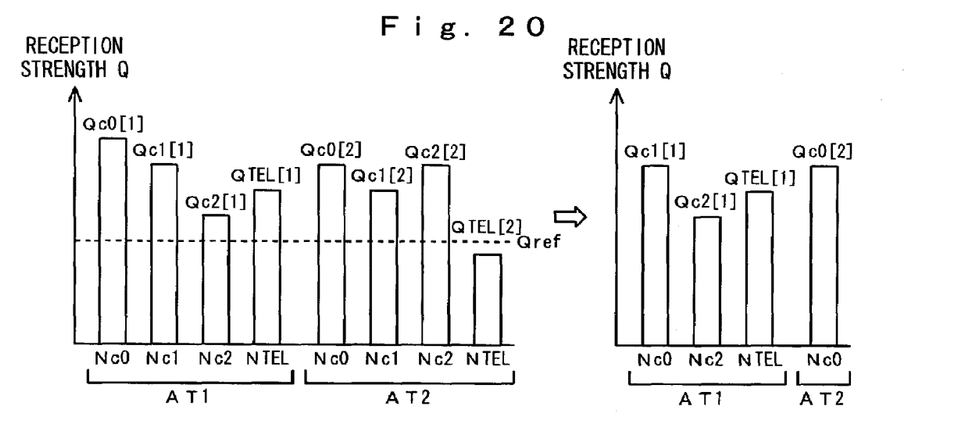
FIG. 20 is diagrams schematically showing operation of the flow chart shown in FIG. 15.

FIG. 20 is a diagram schematically showing a distributing method of each terminal according to the present embodiment. Since the reception status level QTEL[2] of the terminal NTEL at BT2 is lower than the reference value Qref3, the terminals NC1, NC2, and NTEL including this terminal NTEL other than the terminal NC0 establish the piconet with BT1 and the terminal NC0 establishes the piconet with BT2.

According to the present embodiment, a combination in which the reception status level Q is lowest is avoided from all the combinations so that excellent communication quality can be averagely secured.

Figure 16:
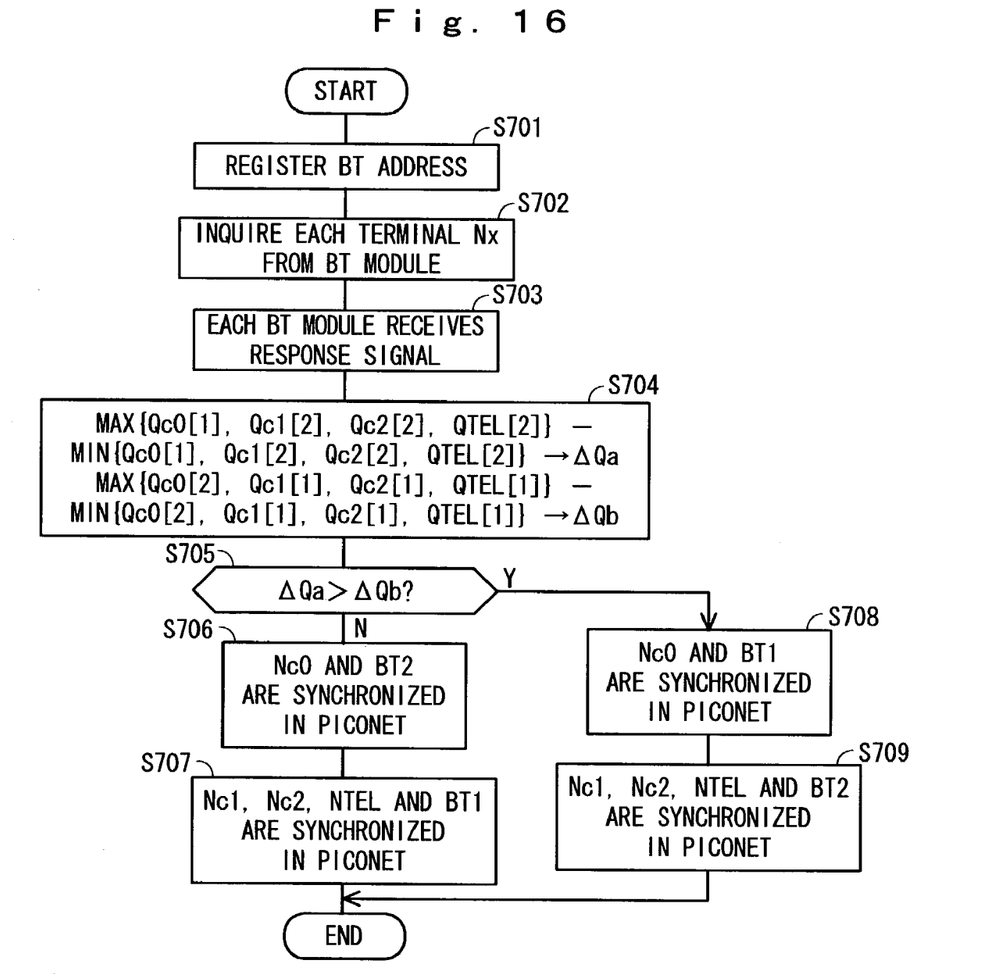

FIG. 16 is a flow chart showing still another example of the operation of distributing a plurality of terminals into the base station N having the configuration of the second embodiment shown in FIG. 3, where in steps S701 to S703, the processing similar to that in the steps S301 to S303 is performed.

In step S704, there is obtained a difference $\Delta Qa$ between the maximum value (MAX) and the minimum value (MIN) out of the reception status level QC0[1] at BT1 of the terminal NC0, and the reception status levels QC1[2], QC2 [2] QTEL[2] at BT2 of the other terminals NC1, NC2, NTEL. Further, there is obtained a difference $\Delta Qb$ between the maximum value (MAX) and the minimum value (MIN) out of the reception status level QC0[2] at BT2 of the terminal NC0, and the reception status levels QC1 [1], QC2 [1], QTEL[1] at BT1 of the terminals NC1, NC2, NTEL.

In step S705, the differences $\Delta Qa$ and $\Delta Qb$ are compared. When $\Delta Qa$ is larger than $\Delta Qb$, the processing proceeds to step S706. In step S706, BT2 performs paging to the terminal NC0 to establish the piconet. In step S707, BT1 performs paging to the other terminals Nx to establish the piconet.

When it is determined that $\Delta Qa$ is not larger than $\Delta Qb$ in the step S705, the processing proceeds to step S708. In step S708, BT1 performs paging to the terminal NC0 to establish the piconet. In step S709, BT2 performs paging to the other terminals (NC1, NC2, NTEL) to establish the piconet.

Figure 21:
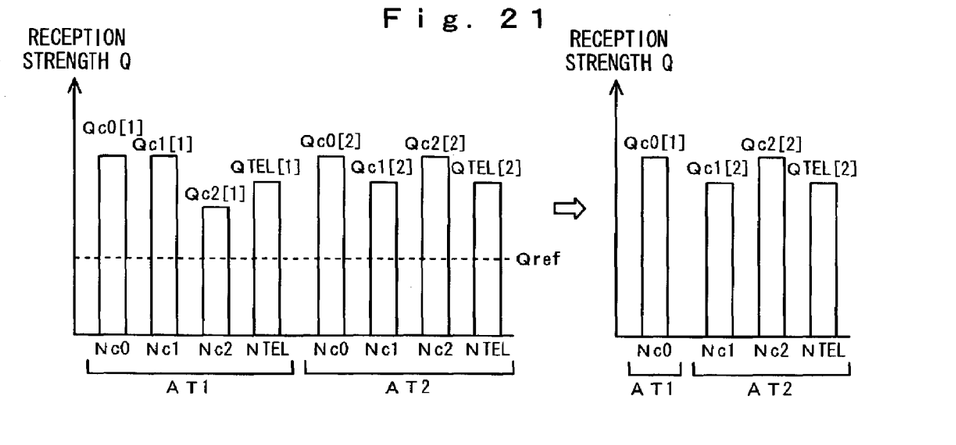
FIG. 21 is diagrams schematically showing operation of the flow chart shown in FIG. 16.

FIG. 21 is a diagram schematically showing a distributing method of each terminal according to the present embodiment. Here, since the maximum value of the difference between the terminal NC0 and the other terminals NC, NC2, NTEL becomes larger in the opposite case to the case where the terminal NC0 establishes the piconet with BT1 and the other terminals NC1, NC2 and NTEL establish the piconet with BT2, the terminal NC0 and BT1 establish the piconet, and the other terminals NC1, NC2, NTEL and BT2 establish the piconet.

According to the present embodiment, since a difference between the reception status level Q of the driver terminal NC0 and the reception status level Q of the other terminal becomes smaller, the driver can make communication in the reception status similar to that of each terminal.

In each embodiment described above, description is made assuming that the Bluetooth module is employed as the wireless module, but the present invention is not limited thereto, and can be similarly applied to the case where a wireless module conformable to other wireless network standard (for example IEEE802.11 or 802.11b) is employed.

According to the present invention, the following effects can be obtained.

(1) Since one antenna of a plurality of antennas provided in the base station is arranged at the front of the vehicle and the other antenna is arranged at the rear thereof so that the respective antennas are separately arranged at the maximum by making use of the vehicle length, a wide communication area having less blind spots can be secured.

(2) Since one antenna of a plurality of antennas provided in the base station is arranged at the right side of the vehicle and the other antenna is arranged at the left side thereof so that the respective antennas are separately arranged at the maximum by making use of the vehicle width, a wide communication area having less blind spots can be secured.

(3) Since a plurality of antennas are provided in the base station and one antenna and the other antenna are separately arranged sandwiching an occupant's sitting position, the occupant positioned between the antennas can function as a radio wave shielding object. Therefore, not only even when interference between the respective antennas is reduced but also even when reception at one antenna is prevented by the occupant as the radio wave shielding object, this can be compensated by the other antenna so that communication quality can be improved.

(4) Since a pair of longitudinal antennas is separately arranged along the edge of the helmet, a pair of antennas can be arranged on the outer shell of the helmet without deteriorating its appearance.

(5) Since a pair of longitudinal antennas is arranged at the front and rear of the helmet so that the longitudinal sides of the antennas are substantially parallel to the lower edge of the helmet, a wide communication area can be secured even when the occupant faces any direction.

(6) Since a pair of longitudinal antennas is arranged at the right and left sides of the helmet so that the longitudinal sides of the antennas are substantially parallel to the lower edge of the helmet, a wide communication area can be secured not only with a full-face helmet but also with a jet helmet.

(7) Since a pair of longitudinal antennas is arranged at positions opposite to the outer shell of the helmet so that the longitudinal sides of the antennas are substantially parallel to the lower edge of the helmet, a pair of antennas can be arranged at optimum positions where both antennas can compensate for the communication area.

What is claimed is:

1. A two wheel vehicle intercommunication apparatus comprising:
a base station mounted on a two wheel vehicle and a plurality of antennas for transmitting and receiving thereof, a plurality of portable terminals owned by respective occupants and antennas thereof, where each portable terminal communicates via the base station,
wherein the plurality of antennas of the base station is exposed to an exterior of the two wheel vehicle and separately arranged at two or more positions of handle grips, turn signals, a meter unit, and behind the rear seat, in order to sandwich the portable terminals owned by said occupants sitting in a sitting position,
wherein said base station includes an antenna control circuit comprising a diversity reception function which selects one signal among those received at the plurality of antennas or combines all signals received at the plurality of antennas,
wherein the antennas of the portable terminals are a pair of longitudinal antennas provided on a helmet,
wherein the pair of longitudinal antennas is unified with edge rubber provided at the lower edge of the helmet in order to be separately arranged from each other along the lower edge of the helmet, and
wherein each of the longitudinal antennas are transmitting and receiving antennas.

2. The two wheel vehicle intercommunication apparatus according to claim 1, wherein the pair of longitudinal antennas is arranged along the respective lower edges of the front and rear of the helmet.

3. The two wheel vehicle intercommunication apparatus according to claim 1, wherein the pair of longitudinal antennas is arranged along the respective lower edges of the right and left sides of the helmet.

4. The two wheel vehicle intercommunication apparatus according to claim 1, wherein the pair of longitudinal antennas is integrally formed with edge rubber provided at the respective lower edges of the right and left sides of the helmet.

5. The two wheel vehicle intercommunication apparatus according to claim 1, wherein the pair of longitudinal antennas is fixed on edge rubber surfaces provided at the respective lower edges of the right and left sides of the helmet.

6. The two wheel vehicle intercommunication apparatus according to claim 1,
wherein the plurality of antennas of the base station are arranged at at least two positions separated in a front and rear direction or separated in a right and left direction of said vehicle.

7. The two wheel vehicle intercommunication apparatus according to claim 1, wherein a communication standard conforms to a Bluetooth standard and the base station establishes a piconet with each portable terminal.

8. The two wheel vehicle intercommunication apparatus according to claim 7, wherein the base station comprises only one Bluetooth module to which the plurality of antennas are connected.

9. The two wheel vehicle intercommunication apparatus according to claim 7, wherein the base station comprises a plurality of Bluetooth modules to which the plurality of antennas are connected respectively.

* * * * *